(12) United States Patent
He

(10) Patent No.: US 10,924,457 B2
(45) Date of Patent: Feb. 16, 2021

(54) PACKET CLEANING METHOD AND APPARATUS

(71) Applicant: ALIBABA GROUP HOLDING LIMITED, George Town (KY)

(72) Inventor: Weibin He, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 217 days.

(21) Appl. No.: 16/024,523

(22) Filed: Jun. 29, 2018

(65) Prior Publication Data

US 2018/0309726 A1    Oct. 25, 2018

Related U.S. Application Data

(63) Continuation of application No. PCT/CN2016/110659, filed on Dec. 19, 2016.

(30) Foreign Application Priority Data

Dec. 31, 2015  (CN) .......................... 2015 1 1030202

(51) Int. Cl.
*H04L 29/06* (2006.01)
(52) U.S. Cl.
CPC ...... *H04L 63/0245* (2013.01); *H04L 63/1408* (2013.01); *H04L 63/1458* (2013.01); *H04L 69/22* (2013.01)
(58) Field of Classification Search
CPC ............. H04L 63/0245; H04L 63/1408; H04L 63/1458; H04L 63/0236; H04L 69/22
See application file for complete search history.

(56) References Cited

U.S. PATENT DOCUMENTS 7,966,654 B2 *  6/2011  Crawford ............ H04L 63/0236
                                                              726/11
8,886,927 B2 * 11/2014  Jiang .................... G06F 9/45533
                                                              713/151

(Continued)

FOREIGN PATENT DOCUMENTS

CN          1972297        5/2007
CN        101309150 A     11/2008

(Continued)

OTHER PUBLICATIONS

First Search Report issued in corresponding International Application No. 201511030202.1 (2 pgs.).
First Office Action issued by The State Intellectual Property Office of People's Republic of China in corresponding Chinese Application No. 201511030202.1; dated Aug. 27, 2019 (25 pgs.).
The Design and Implementation of Cleaning System of the Network Application Layer Flow; 1994-2015 China Academic Journal Electronic Publishing House; Jul. 2014 (10 pgs.).
Research on Techniques in Network Security Situation Assessment and Prediction; Jan. 2010 (2 pgs.).

(Continued)

*Primary Examiner* — Khoi V Le
(74) *Attorney, Agent, or Firm* — Finnegan, Henderson, Farabow, Garrett & Dunner, LLP

(57) ABSTRACT

The present disclosure discloses a packet cleaning method and apparatus. The method includes: acquiring a packet type and a destination address of a target packet; acquiring, from a configuration file, a first attack type set according to the packet type and a second attack type set according to the destination address, wherein the second attack type set comprises types of attacks that a device corresponding to the destination address receives from within a period of time; generating a cleaning strategy chain corresponding to the target packet according to the first attack type set and the second attack type set; and cleaning the target packet based on the cleaning strategy chain.

18 Claims, 7 Drawing Sheets

(56) References Cited

U.S. PATENT DOCUMENTS

| | | | | |
|---|---|---|---|---|
| 9,027,136 B2* | 5/2015 | Be'ery | ............... | H04L 63/1408 |
| | | | | 726/23 |
| 2012/0117646 A1* | 5/2012 | Yoon | ................. | H04L 63/1458 |
| | | | | 726/22 |
| 2012/0185585 A1* | 7/2012 | Bhate | ................ | H04L 63/1425 |
| | | | | 709/224 |

FOREIGN PATENT DOCUMENTS

| | | |
|---|---|---|
| CN | 101431449 A | 5/2009 |
| CN | 101741633 A | 6/2010 |
| CN | 104539594 | 4/2015 |
| CN | 104753863 A | 7/2015 |
| WO | WO 2017/114200 A1 | 7/2017 |

OTHER PUBLICATIONS

PCT International Preliminary Report on Patentability, International Written Opinion and International Search Report issued in corresponding PCT Application No. PCT/CN2016/110659; dated Mar. 2, 2017 (13 pgs.).

Second Chinese Office Action issued by The State Intellectual Property Office of People's Republic of China issued in related Chinese Application No. 201511030202.1, dated Jun. 2, 2020 (8 pgs.).

Zheng et al., "High performance information filtering system for large-scale alarm data." Computer Engineering and Design, Feb. 2014, vol. 35, No. 2 (5 pgs.).

\* cited by examiner

PACKET CLEANING METHOD AND APPARATUS

CROSS REFERENCE TO RELATED APPLICATION

The disclosure claims the benefits of priority to International Application Number PCT/CN2016/110659, filed Dec. 19, 2016, which claims priority to Chinese Application Number CN201511030202.1, filed Dec. 31, 2015, both of which are incorporated herein by reference in their entireties.

BACKGROUND

During a packet attack, network traffic can be drawn to a cleaning device to filter attack packets. A packet can enter into the cleaning device from an incoming direction, and a strategy corresponding to a destination IP of the packet can be queried according to the destination IP of the packet. It may be decided to "accept", "pass", or "discard" the packet according to the strategy.

Conventionally, one or more strategies corresponding to an attack type can be provided, and the cleaning device can execute these strategies. Strategies can be pre-configured. For example, possible types of attacks that a protected IP may suffer from can be predicted, and strategies corresponding to these types of attacks can be added to a strategy chain.

However, a packet may enter an unnecessary strategy and be cleaned mistakenly, thus reducing the cleaning efficiency of the cleaning device.

SUMMARY OF THE DISCLOSURE

Embodiments of the present disclosure provide a packet cleaning method and apparatus, to address the above problem.

According to an aspect of the embodiments of the present disclosure, a packet cleaning method can be provided. The method can include: acquiring a packet type and a destination address of a target packet; acquiring, from a configuration file, a first attack type set according to the packet type, and a second attack type set according to the destination address, wherein the second attack type set comprises types of attacks that a device corresponding to the destination address receives from within a period of time; generating a cleaning strategy chain corresponding to the target packet according to the first attack type set and the second attack type set; and cleaning the target packet based on the cleaning strategy chain.

According to another aspect of the embodiments of the present disclosure, a packet cleaning device is further provided. The device can include: a first acquisition unit configured to acquire a packet type and a destination address of a target packet; a second acquisition unit configure to acquire, from a configuration file, a first attack type set according to the packet type and a second attack type set according to the destination address, wherein the second attack type set comprises types of attacks that a device corresponding to the destination address receives from within a period of time; a generation unit configured to generate a cleaning strategy chain corresponding to the target packet according to the first attack type set and the second attack type set; and a cleaning unit configured to clean the target packet based on the cleaning strategy chain.

BRIEF DESCRIPTION OF THE DRAWINGS

The accompanying drawings described here are used to provide further understanding of the present disclosure and constitute a part of the present disclosure. The exemplary embodiments of the present disclosure and the description of the embodiments are used to illustrate the present disclosure, but do not constitute any improper limitation to the present disclosure.

DETAILED DESCRIPTION

In order to help those skilled in the art better understand technical solutions of the present disclosure, the technical solutions in embodiments of the present disclosure are described below with reference to the accompanying drawings in the embodiments of the present disclosure. It is apparent that the embodiments described are merely some embodiments rather than all embodiments of the present disclosure. Based on the embodiments in the present disclosure, all other embodiments obtained by those of ordinary skill in the art without making creative efforts should belong to the protection scope of the present disclosure.

It should be noted that, terms such as "first" and "second" in the specification, claims, and accompanying drawings of the present disclosure are used for distinguishing similar objects, but do not necessarily describe any particular sequence or order. It should be understood that data used in such a manner can be interchanged in proper situations, so that the embodiments of the present disclosure described here can be implemented in sequences other than those depicted or described here. In addition, the terms "include", "have" or their variations are intended to cover non-exclusive inclusion, so that a process, method, system, product or device including a series of steps or units not only includes the steps or units expressly listed, but also includes other steps or units that are not expressly listed or inherent steps or units of the process, method, product or device.

According to embodiments of the present disclosure, a packet cleaning method can be provided. It should be noted that, steps shown in the flowchart of the accompanying drawing can be executed in a computer system such as a set of computer executable instructions. Moreover, the steps shown or described in the disclosure can be performed in a different order in some cases.

Figure 1:
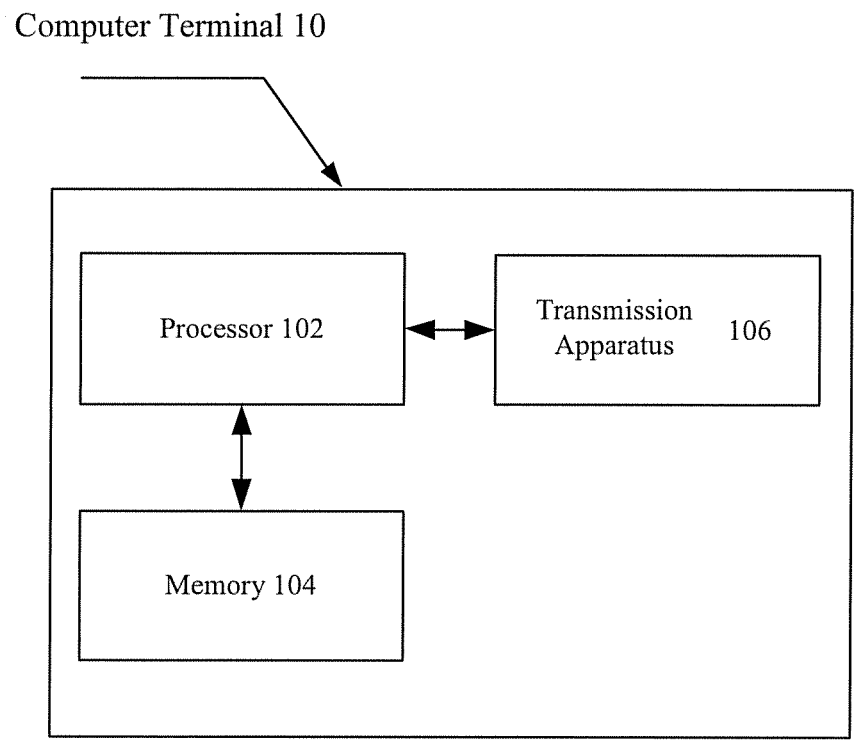
FIG. 1 is a structural block diagram of an exemplary computer terminal running a packet cleaning method, according to embodiments of the present disclosure.

The packet cleaning method can be performed in a mobile terminal, a computer terminal, or a similar computing apparatus. By taking running on a computer terminal as an example, FIG. 1 is a structural block diagram of hardware of a computer terminal 10 running a packet cleaning method according to embodiments of the present disclosure. As shown in FIG. 1, computer terminal 10 can include one or more (merely one is shown in the figure) processors 102, a memory 104 configured to store data, and a transmission apparatus 106 configured for a communication function. Processor 102 can include, but is not limited to, a processing apparatus such as a microprocessor MCU or a programmable logic device FPGA. It is appreciated that the structure shown in FIG. 1 is merely illustrative and is not intended to limit the structure of the above electronic apparatus. For example, computer terminal 10 can further include components more or fewer than those shown in FIG. 1 or can have a configuration different from that shown in FIG. 1.

Memory 104 can be configured to store a software program and a module of application software (e.g., a program instruction/module corresponding to the packet cleaning method in the embodiment of the present disclosure). Processor 102 runs the software program and module stored in memory 104 to execute various functional applications and data processing to implement the above packet cleaning method. Memory 104 can include a high-speed random access memory (RAM), and can further include a non-volatile memory, such as one or more magnetic storage apparatuses, a flash memory, or other non-volatile memories. In some examples, memory 104 may further include memories remotely disposed with respect to processor 102, and the remote memories can be connected to computer terminal 10 through a network. The example of the network includes, but is not limited to, the Internet, an intranet, a local area network, a mobile communication network, and their combinations.

Transmission apparatus 106 can be configured to receive or send data via a network. The network can include a wireless network provided by a communication provider of computer terminal 10. In an example, transmission apparatus 106 includes a network interface controller (NIC) that can be connected with another network device by means of a base station, so as to communicate with the Internet. In an example, transmission apparatus 106 can be a radio frequency (RF) module, which is configured to communicate with the Internet in a wireless manner.

Figure 2:
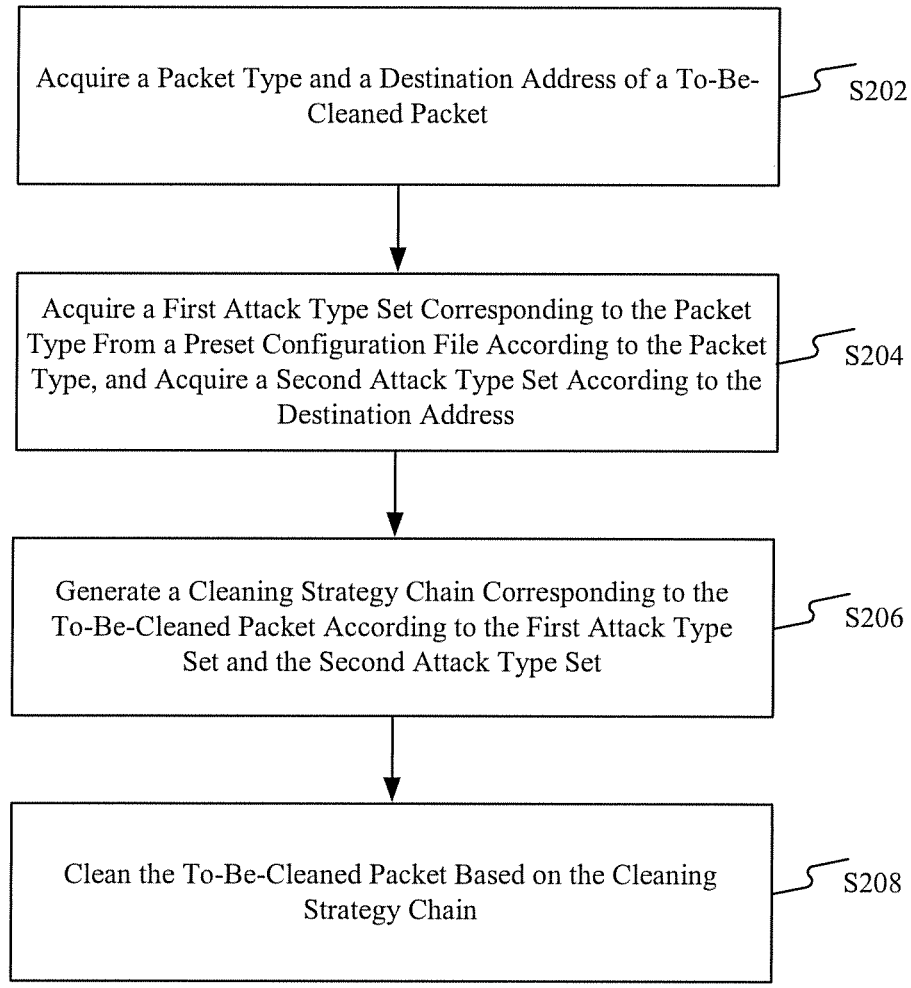
FIG. 2 is a schematic flowchart of an exemplary packet cleaning method, according to embodiments of the present disclosure.

In the above exemplary running environment, the present disclosure provides a packet cleaning method as shown in FIG. 2. FIG. 2 is a flowchart of an exemplary packet cleaning method 200, according to embodiments of the present disclosure. Packet cleaning method 200 can include steps S202-S208.

In step S202, a packet type and a destination address of a target packet can be acquired.

In some embodiments of the present disclosure, the packet type can include at least one of: a transmission control protocol synchronous (TCP SYN) packet, a transmission control protocol acknowledge (TCP ACK) packet, and a transmission control protocol reset (TCP RST) packet. The destination address can indicate a device to which the target packet is sent.

In some embodiments, step S202 can include sub-steps S10 and S12.

In S10, a header of the target packet can be parsed. The header of the target packet can be parsed to acquire the packet type and the destination address of the target packet.

In step S12, the packet type can be extracted from the target packet based on an offset of a field corresponding to the packet type, and the destination address can be extracted from the target packet based on an offset of a field corresponding to the destination address. After the header of the target packet is parsed, the packet type can be extracted from the target packet based on an offset of a field corresponding to the packet type, and the destination address can be extracted from the target packet based on an offset of a field corresponding to the destination address. The offset of the field corresponding to the packet type and the offset of the field corresponding to the destination address can be determined from a protocol.

In step S204, from a configuration file, a first attack type set corresponding to the packet type can be acquired according to the packet type and a second attack type set can be acquired according to the destination address.

A packet type of an incoming target packet can be analyzed, and a first attack type set (denoted as AttackSet_1) corresponding to the packet type can be acquired. It should be noted that, a packet type can correspond to an attack type. Therefore, relationships between attack types and packet types can be generated and stored as a configuration file. Based on the configured file, attacks that may be caused by a target packet can be speculated reversely according to the packet type of the target packet during packet cleaning.

The first attack type set includes an attack type corresponding to the packet type, and the attack type includes at least one of: SYN flood, ACK flood, RST flood, and UDP flood.

For example, Table 1 shows the configuration file, which includes the packet type, the attack type, and a correspondence between the packet type and the attack type:

TABLE 1

| Serial Number | Packet Type | Attack Type |
|---|---|---|
| 1 | TCP SYN packet | SYN flood |
| 2 | TCP ACK packet | ACK flood |
| 3 | TCP RST packet | RST flood |

In some embodiments, acquiring the first attack type set can further include sub-steps S20 and S22.

In step S20, an attack type corresponding to the packet type can be searched for from the configuration file. The configuration file can include a correspondence between the packet type and the attack type. For example, if the packet type of the target packet is a TCP ACK packet, an attack type ACK flood corresponding to the packet type TCP ACK can be determined from Table 1.

In step S22, the first attack type set including the attack type corresponding to the packet type can be generated. For example, when the packet type of the target packet is a TCP ACK packet, a first attack type set AttackSet_1={ACK flood} can be generated based on the attack type ACK flood found from Table 1.

Further, the second attack type set includes types of attacks that a device corresponding to the destination address receives within a period of time.

For example, a hacker can perform a Distributed Denial of Service (DDOS) attack. In the DDOS attack, an attacker can send a large amount of attack packets to an attacked target by controlling a large number of zombie hosts, such that the attacked target rejects to provide services to requests of normal users due to network congestion and exhausted system resources. Moreover, the hacker can launch multiple types of DDOS attacks at a same time, such as SYN flood, RST flood, and UDP flood. Therefore, the second attack type set (denoted as AttackSet_2) can include at least one of SYN flood, RST flood, and UDP flood.

It is appreciated that a weight value of the first attack type set can be acquired from the packet cleaning device, and a weight value of the second attack type set can be a preset value. The weight value can be used to indicate an arrangement and composition of a cleaning strategy chain generated subsequently, which will be described in detail in the subsequent embodiment and will not be elaborated here.

In step S206, a cleaning strategy chain corresponding to the target packet can be generated according to the first attack type set and the second attack type set.

Step S206 can include the sub-steps S30 and S40.

In sub-step S30, an intersection of the first attack type set and the second attack type set can be determined to obtain a third attack type set. Therefore, the third attack type set can include attack types that are included in both the first and second attack types. The third attack type set can include identical attack types in the first attack type set and the second attack type set. For example, when the packet type of the target packet is a TCP ACK packet, AttackSet_1={ACK flood}, AttackSet_2={SYN flood, RST flood, ACK flood}, and an intersection of AttackSet_1 and AttackSet_2 is determined to obtain the third attack type set (denoted as AttackSet_3): {ACK flood}.

In sub-step S32, the cleaning strategy chain can be generated according to the third attack type set. After the third attack type set is obtained, the cleaning strategy chain for the target packet can be generated based on a weight value of each attack type in the third attack type set. For example, step S32 can include sub-steps S40-S46.

In sub-step S40, a weight value of each attack type in the third attack type set can be acquired. The weight value can be an index used for measuring a proportion of an attack type in the first attack type set and the second attack type set. For example, the Packets per Second (PPS) of TCP SYN packets causing the SYN flood is 10,000, the PPS of TCP RST packets causing the RST flood is 5,000, and the TCP PPS of UDP packets causing the UDP flood is 20,000. Then, the weight of the SYN flood can be two, the weight of the RST flood can be one, and the weight of the UDP flood can be four. The weight value can also be preset. For example, the weight of the ACK flood in the first attack type set can be set to three.

In sub-step S42, the attack types can be sorted according to the weight values.

In sub-step S44, cleaning strategies corresponding to the sorted attack types can be acquired, wherein an arrangement order of the cleaning strategies is consistent with an arrangement order of the sorted attack types. For example, cleaning strategies corresponding to the sorted attack types (e.g., Rule_a, Rule_b, Rule_c, and Rule_d) can be acquired based on sorting of the attack types.

In sub-step S46, the cleaning strategy chain including the cleaning strategies corresponding to the sorted attack types can be generated. The cleaning strategy chain (denoted as RuleList) RuleList={Rule_a, Rule_b, Rule_c, Rule_d} can be obtained.

For example, attack types included in AttackSet_3 are Attack_1 and Attack_2. According to the configuration file, the cleaning strategy set of Attack_1 is RuleSet_1 including cleaning strategies Rule_a and Rule_b, and the cleaning strategy set of Attack_2 is RuleSet_2 including cleaning strategies Rule_b and Rule_c.

In some embodiments, if the weight of Attack_1 is higher than that of Attack_2, the generation logic of the final strategy chain RuleList can be expressed by using the following formula:

RuleList={RuleSet_1,RuleSet_2}={Rule_$a$,Rule_$b$, Rule_$b$,Rule_$c$}={Rule_$a$,Rule_$b$,Rule_$c$}

In some embodiments, if the weight of Attack_2 is higher than that of Attack_1, the generation logic of the final strategy chain RuleList can be expressed by using the following formula:

RuleList={RuleSet_2,RuleSet_1}={Rule_$b$,Rule_$c$, Rule_$a$,Rule_$b$}={Rule_$b$,Rule_$c$,Rule_$a$}

It is appreciated that, during the determination of attack types, it is an intersection of the first attack type set and the second attack type set. And during the determination of cleaning strategies, it is a union of two the cleaning strategy sets.

It is appreciated that if the cleaning device does not support weight values, a default weight value is used. As such, Rule_a, Rule_b, and Rule_c in the RuleList do not need a sequential order, and it is only required to simply take an intersection.

In step S208, the target packet can be cleaned based on the cleaning strategy chain.

When the target packet enters the cleaning strategy chain, each cleaning strategy is called sequentially according to the generated cleaning strategy chain. If the target packet is "discarded", the cleaning strategy chain can be ended and the target packet can be discarded. If the target packet is "passed", a subsequent cleaning strategy can be called according to the order of the cleaning strategies. If the target packet is "accepted" or is not "discarded" after passing all the cleaning strategies, the target packet can be sent to an outgoing direction channel, and then forwarded to an original destination (e.g., the device corresponding to the destination address).

It is appreciated that inputs and outputs of all the cleaning strategies can be consistent in the packet cleaning method. For example, all inputs can be uniform pointers of the packets, all outputs can be uniform actions for the packets (e.g., "accept", "pass", "reject"). All the cleaning strategies can be registered uniformly. For example, function pointers of all the cleaning strategies can be uniformly associated with a global variable. All the cleaning strategies can be uniformly numbered, and a cleaning strategy can be cited within a program by using a strategy number. The cleaning strategy chain can be a vector with strategy numbers as elements.

As can be seen from the above, the solution provided in the above embodiments of the present disclosure obtains a dynamic cleaning strategy chain corresponding to a target packet based on a packet type and a destination address of the target packet And the solution achieves the technical effect of improving the packet cleaning efficiency, and solves the technical problem of low cleaning efficiency of a cleaning device due to pre-configured strategies.

In some embodiments, cleaning the target packet based on the cleaning strategy chain can include: calling each cleaning strategy sequentially according to the order of the cleaning strategies in the cleaning strategy chain, to clean the target packet, so as to determine whether to discard the target packet.

Further, when it is determined not to discard the target packet, the packet cleaning method can further include: sending the target packet to the device corresponding to the destination address.

As can be seen from above, embodiments of the present disclosure provide a packet cleaning method, which can obtain a dynamic cleaning strategy chain corresponding to a target packet based on a packet type and a destination address of the target packet, and achieve the objective of targeted packet cleaning, thus implementing the technical effect of improving the packet cleaning efficiency.

It is appreciated that, for ease of description, the method mentioned above is described as a series of action combinations. However, the present disclosure is not limited to the action order described here, because some steps may be performed in other orders or simultaneously according.

The method according to the above embodiments can be implemented by software, hardware, or a combination of both software and hardware. The software can be implemented in a computer software product. The computer software product may be stored in a storage medium (such as a read-only memory (ROM)/RAM, a magnetic disk or an optical disc), and includes a set of instructions for causing a terminal device (e.g., a mobile phone, a computer, a server, a network device, or the like) to perform the methods described in embodiments of the present disclosure.

Figure 3:
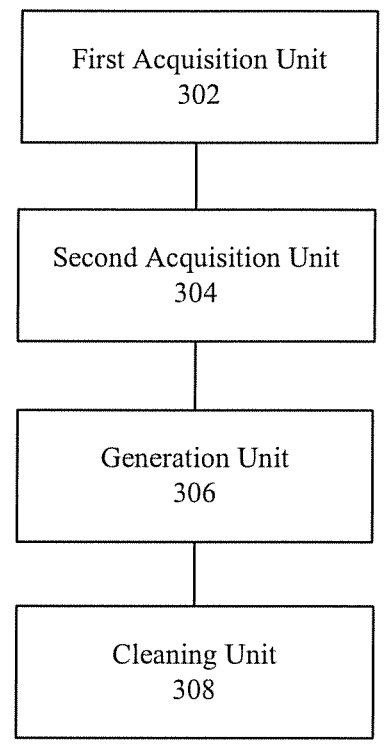
FIG. 3 is a schematic structural diagram of an exemplary packet cleaning device, according to embodiments of the present disclosure.

Embodiments of the present disclosure further provide a packet cleaning device. FIG. 3 is a schematic structural diagram of a packet cleaning device 300 according to embodiments of the present disclosure.

As shown in FIG. 3, packet cleaning device 300 can include a first acquisition unit 302, a second acquisition unit 304, a generation unit 306, and a cleaning unit 308.

First acquisition unit 302 can be configured to acquire a packet type and a destination address of a target packet. Second acquisition unit 304 can be configured to acquire a first attack type set corresponding to the packet type from a configuration file according to the packet type and acquire a second attack type set according to the destination address, wherein the second attack type set includes types of attacks that a device pointed to by the destination address suffers from within a period of time. Generation unit 306 can be configured to generate a cleaning strategy chain corresponding to the target packet according to the first attack type set and the second attack type set. Cleaning unit 308 can be configured to clean the target packet based on the cleaning strategy chain.

Figure 4:
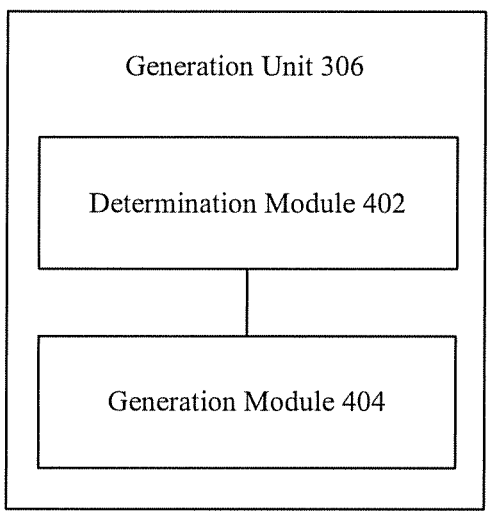
FIG. 4 is a schematic structural diagram of an exemplary generation unit, according to embodiments of the present disclosure.

In some embodiments, as shown in FIG. 4, generation unit 306 includes: a determination module 402 and a generation module 404.

Determination module 402 can be configured to determine an intersection of the first attack type set and the second attack type set to obtain a third attack type set, wherein the third attack type set includes identical attack types in the first attack type set and the second attack type set. Generation module 404 can be configured to generate the cleaning strategy chain according to the third attack type set.

Generation module 404 can be configured to generate the cleaning strategy chain according to the third attack type set by performing the following steps: acquiring a weight value of each attack type in the third attack type set; sorting the attack types according to magnitudes of the weight values; acquiring cleaning strategies corresponding to the sorted attack types, wherein an arrangement order of the cleaning strategies is consistent with an arrangement order of the sorted attack types; and generating the cleaning strategy chain including the cleaning strategies corresponding to the sorted attack types.

In some embodiments, cleaning unit 308 can be configured to clean the target packet based on the cleaning strategy chain by performing the following steps: calling each cleaning strategy sequentially according to the order of the cleaning strategies in the cleaning strategy chain, to clean the target packet, so as to determine whether to discard the target packet.

Figure 5:
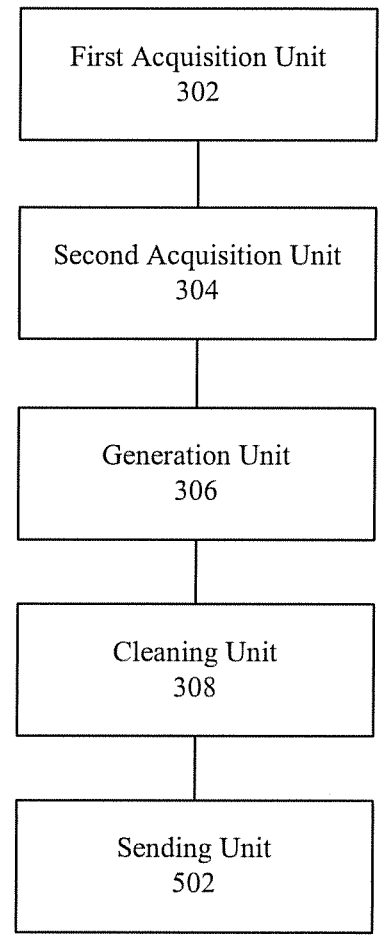
FIG. 5 is a schematic structural diagram of another exemplary packet cleaning device, according to embodiments of the present disclosure.

In some embodiments, as shown in FIG. 5, the packet cleaning device can further include: a sending unit 502 configured to send the target packet to the device pointed to by the destination address when it is determined not to discard the target packet.

Figure 6:
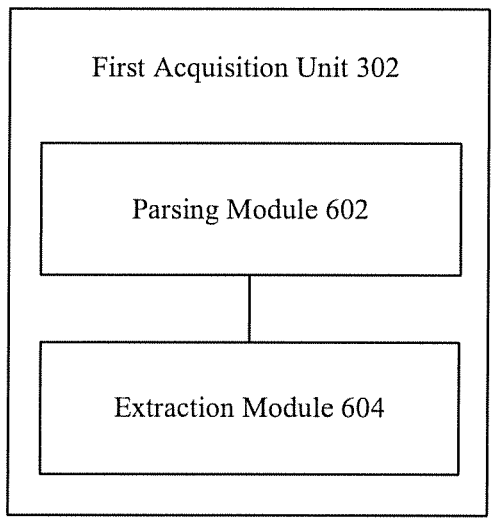
FIG. 6 is a schematic structural diagram of an exemplary first acquisition unit, according to embodiments of the present disclosure.

In some embodiments, as shown in FIG. 6, first acquisition unit 302 includes: a parsing module 602 and an extraction module 604.

Parsing module 602 can be configured to parse a header of the target packet. The extraction module 604 can be configured to extract the packet type from the target packet based on an offset of a field corresponding to the packet type and extract the destination address from the target packet based on an offset of a field corresponding to the destination address.

In some embodiments, second acquisition unit 304 can be configured to acquire a first attack type set corresponding to the packet type from a configuration file according to the packet type by performing the following steps: searching for an attack type corresponding to the packet type from the configuration file, wherein the configuration file includes a correspondence between the packet type and the attack type; and generating the first attack type set including the attack type corresponding to the packet type.

In some embodiments, the packet type includes one or more of the following: a TCP SYN packet, a TCP ACK packet, and a TCP RST packet; and the attack type includes one or more of the following: SYN flood, ACK flood, RST flood, and UDP flood.

Detailed description of the above components can also be referred to description of method 200.

Embodiments of the present disclosure can also provide a computer terminal. The computer terminal can be any computer terminal device in a computer terminal group. Optionally, in this embodiment, the computer terminal can also be replaced with a terminal device such as a mobile terminal.

In some embodiments, the computer terminal can be located in at least one network device in multiple network devices of a computer network.

The computer terminal can execute program codes of the following steps of a packet cleaning method: acquiring a packet type and a destination address of a target packet; acquiring a first attack type set corresponding to the packet type from a configuration file according to the packet type, and acquiring a second attack type set according to the destination address, wherein the second attack type set includes types of attacks that a device pointed to by the destination address suffers from within a period of time; generating a cleaning strategy chain corresponding to the target packet according to the first attack type set and the second attack type set; and cleaning the target packet based on the cleaning strategy chain.

Figure 7:
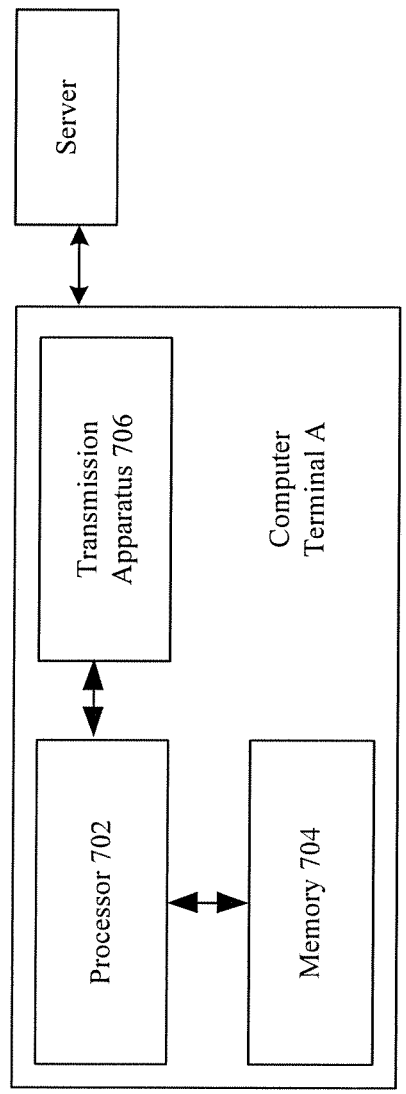
FIG. 7 is a structural block diagram of a computer terminal, according to embodiments of the present disclosure.

FIG. 7 is a structural block diagram of a computer terminal according to embodiments of the present disclosure. As shown in FIG. 7, the computer terminal A can include: one or more (only one is shown in the figure) processors 702, a memory 704, and a transmission apparatus 706.

Memory 704 can be configured to store a software program and a modular program block, e.g., a program instruction/modular program block corresponding to the packet cleaning method in the embodiment of the present disclosure. Processor 702 runs the software program and modular program block stored in memory 704 to execute various functional applications and data processing, i.e., implementing the foregoing packet cleaning method. Memory 704 can include a high-speed RAM, and can further include a non-volatile memory, such as one or more magnetic storage apparatuses, a flash memory, or other non-volatile memories. In some examples, memory 704 may further include memories remotely disposed with respect to the processor, and the remote memories can be connected to the terminal A through a network. The example of the network includes, but is not limited to, the Internet, an intranet, a local area network, a mobile communication network, and their combinations.

Transmission apparatus 706 can be configured to receive or send data via a network. A specific example of the network can include a wired network and a wireless network. In an example, transmission apparatus 706 includes a NIC that can be connected with another network device and router by means of a network cable, so as to communicate with the Internet or a local area network. In an example, transmission apparatus 706 can be an RF module, which is configured to communicate with the Internet in a wireless manner.

For example, memory 704 can be configured to store information about preset action conditions and preset privileged users, as well as application programs.

Processor 702 can use the transmission apparatus to call the information and application programs stored in the memory, to perform the following steps: acquiring a packet type and a destination address of a target packet; acquiring a first attack type set corresponding to the packet type from a configuration file according to the packet type, and acquiring a second attack type set according to the destination address, wherein the second attack type set includes types of attacks that a device pointed to by the destination address suffers from within a period of time; generating a cleaning strategy chain corresponding to the target packet according to the first attack type set and the second attack type set; and cleaning the target packet based on the cleaning strategy chain.

As can be seen from above, the solutions provided in some embodiments of the present disclosure obtain a dynamic cleaning strategy chain corresponding to a target packet based on a packet type and a destination address of the target packet, and achieve the objective of targeted packet cleaning, thus implementing the technical effect of improving the packet cleaning efficiency, and solving the technical problem of low cleaning efficiency of a cleaning device due to pre-configured strategies.

In some embodiments, processor 702 can further execute program codes of the following steps: calculating an intersection of the first attack type set and the second attack type set to obtain a third attack type set, wherein the third attack type set includes identical attack types in the first attack type set and the second attack type set; and generating the cleaning strategy chain according to the third attack type set.

In some embodiments, processor 702 can further execute program codes of the following steps: acquiring a weight value of each attack type in the third attack type set; sorting the attack types according to magnitudes of the weight values; acquiring cleaning strategies corresponding to the sorted attack types, wherein an arrangement order of the cleaning strategies is consistent with an arrangement order of the sorted attack types; and generating the cleaning strategy chain including the cleaning strategies corresponding to the sorted attack types.

In some embodiments, processor 702 can further execute program codes of the following step: calling each cleaning strategy sequentially according to the order of the cleaning strategies in the cleaning strategy chain to clean the target packet, so as to determine whether to discard the target packet.

In some embodiments, processor 702 can further execute program codes of the following step: sending the target packet to the device pointed to by the destination address.

In some embodiments, processor 702 can further execute program codes of the following steps: parsing a header of the target packet; and extracting the packet type from the target packet based on an offset of a field corresponding to the packet type, and extracting the destination address from the target packet based on an offset of a field corresponding to the destination address.

In some embodiments, processor 702 can further execute program codes of the following steps: searching for an attack type corresponding to the packet type from the configuration file, wherein the configuration file includes a correspondence between the packet type and the attack type; and generating the first attack type set including the attack type corresponding to the packet type.

It is appreciated that the structure shown in FIG. 7 is merely illustrative, and the computer terminal can also be a terminal device such as a smart phone (e.g., an Android phone, an iOS phone, and the like), a tablet computer, a palmtop computer, a Mobile Internet Device (MID), or a PAD. FIG. 7 is not intended to limit the structure of the above electronic apparatus. For example, computer terminal 10 can further include components (such as a network interface and a display apparatus) more or fewer than those shown in FIG. 7 or can have a configuration different from that shown in FIG. 7.

In embodiments provided in the present disclosure, it is appreciated that the disclosed order information processing apparatus may be implemented in other manners. The apparatus embodiments described above are only exemplary. For example, division of the units is merely division based on logical functions and there can be other division manners in the actual implementation. For example, a plurality of units or components may be combined or integrated into another system, or some features may be ignored or not performed. In addition, the mutual coupling or direct coupling or communication connections displayed or discussed may be implemented by using some interfaces, and the indirect coupling or communication connections between the units or modules may be implemented electrically or in another form.

The units described as separate parts may be or may not be physically separate. Parts displayed as units may be or may not be physical units and may be located in one position or distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in the form of hardware or may be implemented in the form of a software functional unit.

When the integrated unit is implemented in the form of a software functional unit and sold or used as an independent product, the integrated unit may be stored in a computer readable storage medium. Based on such understanding, the technical solutions of the present disclosure may be implemented fully or in part in the form of a software product. The computer software product is stored in a storage medium and includes several instructions for instructing a computer device (which may be a personal computer, a server, a network device or the like) to perform all or some of the steps of the methods described in the embodiments of the present disclosure. The foregoing storage medium includes: any non-transitory medium that can store program codes, such as a USB flash drive, a ROM, a RAM, a removable hard disk, a magnetic disk, or an optical disc.

The foregoing are only preferred embodiments of the present disclosure. It should be noted by those of ordinary skill in the art that several improvements and modifications can be made without departing from the principle of the present disclosure, and these improvements and modifications should also be construed as the protection scope of the present disclosure.

What is claimed is:

1. A packet cleaning method, comprising:
acquiring a packet type and a destination address of a target packet;
acquiring, from a configuration file, a first attack type set according to the packet type, and a second attack type set according to the destination address, wherein the second attack type set comprises types of attacks that a device corresponding to the destination address receives from within a period of time;
generating a cleaning strategy chain corresponding to the target packet according to the first attack type set and the second attack type set; and
cleaning the target packet based on the cleaning strategy chain, comprising:
calling each cleaning strategy according to an order of cleaning strategies in the cleaning strategy chain, and
determining whether to discard the target packet according to the called cleaning strategy;
sending the target packet to the device corresponding to the destination address in response to the determination of not discarding the target packet.

2. The method according to claim 1, wherein generating the cleaning strategy chain corresponding to the target packet further comprises:
determining an intersection of the first attack type set and the second attack type set to obtain a third attack type set, wherein the third attack type set comprises attack types both included in the first attack type set and the second attack type set; and
generating the cleaning strategy chain according to the third attack type set.

3. The method according to claim 2, wherein generating the cleaning strategy chain according to the third attack type set further comprises:
acquiring a weight value of each attack type in the third attack type set;
sorting the attack types according to the weight values;
acquiring the cleaning strategies corresponding to the sorted attack types, wherein the order of the cleaning strategies is consistent with an order of the sorted attack types; and
generating the cleaning strategy chain including the cleaning strategies corresponding to the sorted attack types.

4. The method according to claim 1, wherein acquiring the packet type and the destination address of the target packet comprises:
parsing a header of the target packet;
extracting the packet type from the target packet based on an offset of a packet type field in the header; and
extracting the destination address from the target packet based on an offset of a destination address field in the header.

5. The method according to claim 1, wherein acquiring, from the configuration file, the first attack type set corresponding to the packet type according to the packet type further comprises:
searching for an attack type corresponding to the packet type from the configuration file, wherein the configuration file comprises a relationship between the packet type and the attack type; and
generating the first attack type set comprising the attack type corresponding to the packet type.

6. The method according to claim 1, wherein the packet type comprises at least one of: a transmission control protocol synchronous (TCP SYN) packet, a transmission control protocol acknowledgment (TCP ACK) packet, and a transmission control protocol reset (TCP RST) packet; and the attack type comprises at least one of: SYN flood, ACK flood, RST flood, and UDP flood.

7. A packet cleaning device, comprising:
a memory storing a set of instructions; and
a processor configured to execute the set of instructions to cause the packet cleaning device to perform:
acquiring a packet type and a destination address of a target packet;
acquiring, from a configuration file, a first attack type set according to the packet type and a second attack type set according to the destination address, wherein the second attack type set comprises types of attacks that a device corresponding to the destination address receives from within a period of time;
generating a cleaning strategy chain corresponding to the target packet according to the first attack type set and the second attack type set; and
cleaning the target packet based on the cleaning strategy chain, comprising:
calling each cleaning strategy according to an order of cleaning strategies in the cleaning strategy chain, and
determining whether to discard the target packet according to the called cleaning strategy;
sending the target packet to the device corresponding to the destination address in response to the determination of not discarding the target packet.

8. The packet cleaning device according to claim 7, wherein the processor is further configured to execute the set of instructions to cause the packet cleaning device to perform:
determining an intersection of the first attack type set and the second attack type set to obtain a third attack type set, wherein the third attack type set comprises attack types both included in the first attack type set and the second attack type set; and
generating the cleaning strategy chain according to the third attack type set.

9. The packet cleaning device according to claim 8, wherein the processor is further configured to execute the set of instructions to cause the packet cleaning device to perform:
acquiring a weight value of each attack type in the third attack type set;
sorting the attack types according to the weight values;
acquiring the cleaning strategies corresponding to the sorted attack types, wherein the order of the cleaning strategies is consistent with an order of the sorted attack types; and
generating the cleaning strategy chain including the cleaning strategies corresponding to the sorted attack types.

10. The packet cleaning device according to claim 7, wherein the processor is further configured to execute the set of instructions to cause the packet cleaning device to perform:

parsing a header of the target packet; and extracting the packet type from the target packet based on an offset of a packet type field in the header, and extracting the destination address from the target packet based on an offset of a destination address field in the header.

11. The packet cleaning device according to claim 7, wherein the processor is further configured to execute the set of instructions to cause the packet cleaning device to perform:

searching for an attack type corresponding to the packet type from the configuration file, wherein the configuration file comprises a relationship between the packet type and the attack type; and generating the first attack type set comprising the attack type corresponding to the packet type.

12. The packet cleaning device according to claim 7, wherein the packet type comprises at least one of: a transmission control protocol synchronous (TCP SYN) packet, a transmission control protocol acknowledgment (TCP ACK) packet, and a transmission control protocol reset (TCP RST) packet; and the attack type comprises at least one of: SYN flood, ACK flood, RST flood, and UDP flood.

13. A non-transitory computer readable medium that stores a set of instructions that is executable by at least one processor of a computer system to cause the computer system to perform a packet cleaning method, the method comprising:

acquiring a packet type and a destination address of a target packet;

acquiring, from a configuration file, a first attack type set corresponding to the packet type according to the packet type and a second attack type set according to the destination address, wherein the second attack type set comprises types of attacks that a device corresponding to the destination address receives from within a period of time;

generating a cleaning strategy chain corresponding to the target packet according to the first attack type set and the second attack type set; and cleaning the target packet based on the cleaning strategy chain, comprising:

calling each cleaning strategy according to an order of cleaning strategies in the cleaning strategy chain, and determining whether to discard the target packet according to the called cleaning strategy;

sending the target packet to the device corresponding to the destination address in response to the determination of not discarding the target packet.

14. The non-transitory computer readable medium according to claim 13, wherein generating the cleaning strategy chain corresponding to the target packet further comprises:

determining an intersection of the first attack type set and the second attack type set to obtain a third attack type set, wherein the third attack type set comprises attack types both included in the first attack type set and the second attack type set; and generating the cleaning strategy chain according to the third attack type set.

15. The non-transitory computer readable medium according to claim 14, wherein generating the cleaning strategy chain according to the third attack type set further comprises:

acquiring a weight value of each attack type in the third attack type set;

sorting the attack types according to the weight values;

acquiring the cleaning strategies corresponding to the sorted attack types, wherein the order of the cleaning strategies is consistent with an order of the sorted attack types; and generating the cleaning strategy chain including the cleaning strategies corresponding to the sorted attack types.

16. The non-transitory computer readable medium according to claim 13, wherein acquiring the packet type and the destination address of the target packet comprises:

parsing a header of the target packet;

extracting the packet type from the target packet based on an offset of a packet type field in the header; and extracting the destination address from the target packet based on an offset of a destination address field in the header.

17. The non-transitory computer readable medium according to claim 13, wherein acquiring, from the configuration file, the first attack type set corresponding to the packet type according to the packet type further comprises:

searching for an attack type corresponding to the packet type from the configuration file, wherein the configuration file comprises a relationship between the packet type and the attack type; and generating the first attack type set comprising the attack type corresponding to the packet type.

18. The non-transitory computer readable medium according to claim 13, wherein the packet type comprises at least one of: a transmission control protocol synchronous (TCP SYN) packet, a transmission control protocol acknowledgment (TCP ACK) packet, and a transmission control protocol reset (TCP RST) packet; and the attack type comprises at least one of: SYN flood, ACK flood, RST flood, and UDP flood.

* * * * *